United States Patent
Henze et al.

(10) Patent No.: US 9,670,337 B2
(45) Date of Patent: Jun. 6, 2017

(54) FLAME-RETARDANT THERMOPLASTIC POLYURETHANE COMPRISING COATED METAL HYDROXIDES BASED ON ALUMINUM

(71) Applicant: BASF SE, Ludwigshafen (DE)

(72) Inventors: Oliver Steffen Henze, Lemfoerde (DE); Oliver Muehren, Bramsche (DE); Alfons Bertels, Diepholz (DE); Sabine Conrad, Diepholz (DE); Thomas Flug, Wagenfeld (DE); Hans Rudolph, Bad Essen (DE); Christian Beckmann, Melle (DE); Dietmar Meier, Stemwede-Oppendorf (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/795,730

(22) Filed: Mar. 12, 2013

(65) Prior Publication Data

US 2013/0245170 A1 Sep. 19, 2013

Related U.S. Application Data

(60) Provisional application No. 61/609,955, filed on Mar. 13, 2012.

(51) Int. Cl.
| | |
|---|---|
| *C08K 3/22* | (2006.01) |
| *C08K 9/06* | (2006.01) |
| *C08K 5/521* | (2006.01) |
| *C08K 5/5419* | (2006.01) |
| *C08L 75/04* | (2006.01) |
| *C08K 5/523* | (2006.01) |

(52) U.S. Cl.
CPC ............... *C08K 5/521* (2013.01); *C08K 3/22* (2013.01); *C08K 5/523* (2013.01); *C08K 5/5419* (2013.01); *C08K 9/06* (2013.01); *C08L 75/04* (2013.01); *C08K 2003/2227* (2013.01)

(58) Field of Classification Search
CPC .... C08K 3/22; C08K 9/04; C08K 9/06; C08L 75/04; C08L 75/08
USPC ......... 523/200, 212, 213; 524/437, 589, 590
See application file for complete search history.

(56) References Cited

U.S. PATENT DOCUMENTS

| | | | |
|---|---|---|---|
| 6,022,404 A * | 2/2000 | Ettlinger et al. ............... | 106/404 |
| 6,750,282 B1 * | 6/2004 | Schall et al. .................. | 524/445 |
| 6,855,275 B1 * | 2/2005 | Bright et al. ................. | 252/609 |
| 7,413,633 B2 * | 8/2008 | Li et al. ...................... | 162/358.4 |
| 2002/0006263 A1 | 1/2002 | Mehl | |
| 2007/0287773 A1 * | 12/2007 | Ramdatt .................. | C08K 3/22 523/212 |
| 2010/0324183 A1 * | 12/2010 | Henze et al. .................. | 524/101 |
| 2013/0245169 A1 * | 9/2013 | Henze et al. .................. | 524/127 |

FOREIGN PATENT DOCUMENTS

| | | |
|---|---|---|
| DE | 101 03 424 A1 | 8/2002 |
| DE | 103 43 121 A1 | 4/2005 |
| EP | 0 617 079 B1 | 2/1999 |
| EP | 0 922 552 A1 | 6/1999 |
| EP | 1 167 429 B1 | 1/2004 |
| EP | 1 491 580 B1 | 9/2007 |
| EP | 1 490 430 B1 | 1/2008 |
| EP | 1 183 306 B1 | 12/2008 |
| EP | 1 874 854 B1 | 6/2009 |
| EP | 2 374 843 A1 | 10/2011 |
| WO | WO 2006/072461 A1 | 7/2006 |
| WO | WO 2011/050520 A1 | 5/2011 |

OTHER PUBLICATIONS

U.S. Appl. No. 14/404,786, filed Dec. 1, 2014, Henze, et al.
U. Almeida Pinto, et al., Flame retardancy in thermoplastic polyurethane elastomers (TPU) with mica and aluminum trihydrate (ATH), Polymer Degradation and Stability, 69 (2000), pp. 257-260.

* cited by examiner

*Primary Examiner* — Vickey Nerangis
(74) *Attorney, Agent, or Firm* — Oblon, McClelland, Maier & Neustadt, L.L.P.

(57) ABSTRACT

The invention relates to a flame-retardant thermoplastic polyurethane based on at least one diisocyanate and on at least one substance reactive toward isocyanate, and preferably on at least one chain extender, and also optionally on at least one catalyst, and comprising at least one flame retardant, and also optionally additives and/or auxiliaries, where one flame retardant is a metal hydroxide at least to some extent surrounded by a coating, and the metal hydroxide is aluminum hydroxide, aluminum oxide hydroxide, or a mixture of said hydroxides, and also to an associated production process and use.

15 Claims, 1 Drawing Sheet

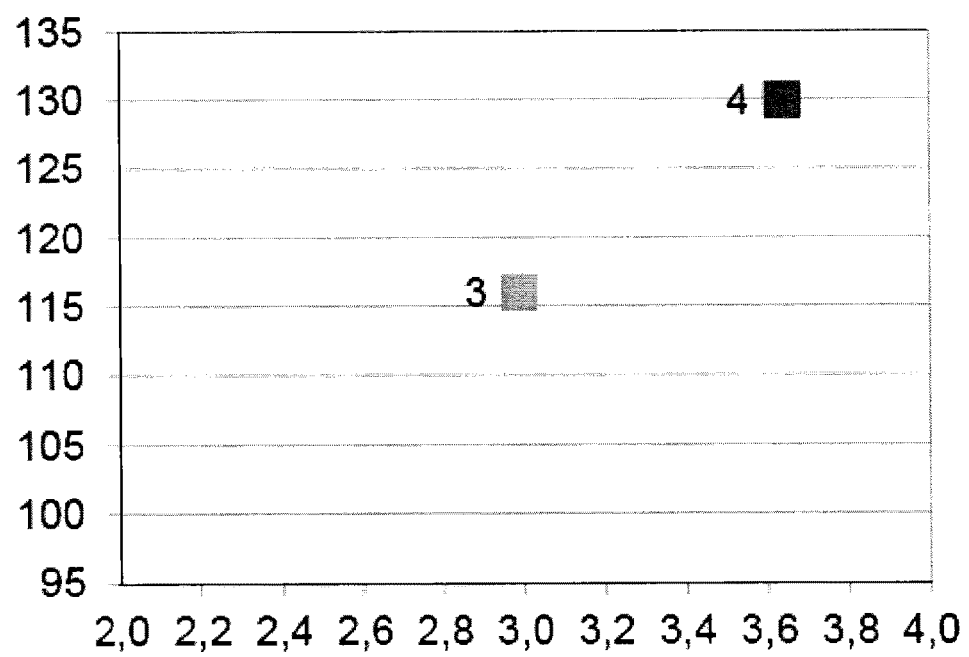

FLAME-RETARDANT THERMOPLASTIC POLYURETHANE COMPRISING COATED METAL HYDROXIDES BASED ON ALUMINUM

The invention relates to flame-retardant thermoplastic polyurethanes.

PRIOR ART

Flame-retardant thermoplastic polyurethanes have been known for a long time. Possibilities here are to admix either halogen-containing or halogen-free flame retardants with the thermoplastic polyurethanes (TPU). A general advantage of the TPU comprising halogen-free flame retardants here is less evolution of toxic and corrosive smoke during combustion. The particular advantages of TPU comprising halogen-free flame retardants have already been described in detail (e.g. EP 00617079 B1; EP 1874854 B1, EP 1490430 B1).

Nitrogen-containing and/or phosphorus-containing flame retardants can be used as halogen-free flame retardants in TPU (EP 00617079 B1; EP 1874854 B1, EP 1490430 B1). The sole use of phosphorus-containing flame retardants often fails to ensure adequate flame retardancy. In contrast, the use of nitrogen-containing flame retardants, alone or in combination with phosphorus-containing flame retardants, frequently provides TPU with very good flame retardancy but also has the disadvantage that the nitrogen-containing compounds can also cause liberation of toxic combustion gases, such as HCN or nitrogen oxides.

Metal hydroxides can also be used, alone or in combination with phosphorus-containing flame retardants and/or with phyllosilicates, as halogen-free flame retardants in TPU (DE 10 343 121A1; EP 1 167 429 B1; EP 01 491 580 B1; EP 1 183 306 B1; WO 2011/050 520 A1). It has been shown that these mixtures firstly exhibit very good flame retardancy properties and secondly exhibit very low smoke toxicity values.

A disadvantage of mixtures based on TPU in combination with metal hydroxides is low aging resistance, making said materials appear unsuitable for many application sectors. By way of example, an attempt is made in EP 2 374 843 A1 to achieve improved aging resistance by adding sparingly soluble oxides of di- and trivalent metals.

OBJECT

The object of the present invention accordingly consisted in providing a flame-retardant thermoplastic polyurethane which has good mechanical properties, which gives good results when processed by the conventional methods, exhibits flame retardancy properties complying with the industrial requirements, and at the same time possesses good hydrolysis resistance and aging resistance, in particular oxidative aging resistance.

GENERAL DESCRIPTION OF THE INVENTION

Surprisingly, the object has been achieved via a flame-retardant thermoplastic polyurethane based on at least one diisocyanate and on at least one substance reactive toward isocyanate, and preferably on at least one chain extender, and also optionally on at least one catalyst, and comprising at least one flame retardant, and also optionally additives and/or auxiliaries, in that at least one flame retardant is a metal hydroxide at least to some extent coated by a coating, and the metal hydroxide is aluminum hydroxide, aluminum oxide hydroxide, or a mixture of said hydroxides. Use of the coated metal hydroxides permitted achievement not only of improved mechanical strength values but also of improved aging resistance. Mechanical strength and aging resistance are based on the flame-retardant thermoplastic polyurethane. Said properties in particular also improve in conjunction with the preferred embodiments. The coating does not in practice have any adverse effect on the flame retardancy property of the thermoplastic polyurethane.

FIGURES

FIG. 1 shows the Petrella plot of example 4, being a graphical depiction of the results of the cone calorimeter measurements of experiments numbers 3 and 4. The tendency of the material to contribute to a rapidly growing fire increases in the direction of the x-axis. The quotient PHRR/tig has been plotted with the unit [kW/m$^2$ s]. The tendency of the material to contribute to a fire of long duration (THR) has been plotted on the y-axis with the unit [MJ/m$^2$]. Materials with better flame retardancy values here exhibit minimum x and y values. The graph provides an impressive demonstration that experiment 3 of the invention exhibits markedly better flame retardancy than experiment 4.

DETAILED DESCRIPTION

The flame-retardant thermoplastic polyurethane based on at least one diisocyanate and on at least one substance reactive toward isocyanate, and preferably on at least one chain extender, and also optionally on at least one catalyst, comprising at least one flame retardant, and also optionally additives and/or auxiliaries, can also be termed flame-retardant preparation based on a thermoplastic polyurethane, where this comprises the reaction product of diisocyanate, of at least one substance reactive toward isocyanate, and preferably of at least one chain extender, and also optionally of at least one catalyst, where the preparation also comprises at least a flame retardant, and also optionally additives and/or auxiliaries.

Metal Hydroxides

Metal hydroxides used in the invention are hydroxides or double hydroxides of aluminum. The advantage of the metal hydroxides is that in the event of fire they exclusively liberate water and therefore do not form any toxic or corrosive smoke products. Furthermore, said hydroxides are capable of reducing smoke density in the event of a fire. However, a disadvantage of said substances is that they firstly promote the hydrolysis of thermoplastic polyurethanes and secondly also have an adverse effect on the oxidative aging of the polyurethanes.

In the context of this invention, the expression oxidative aging is used when the mechanical parameters of the thermoplastic polyurethanes, e.g. tensile strength, tensile strain at break, tear-propagation resistance, flexibility, impact resistance, softness, etc., undergo adverse change over the course of time. In order to check the aging process in the laboratory, the mechanical parameters are determined first prior to high-temperature aging and secondly after appropriate aging. Preferred aging temperatures at which aging is carried out for 7 days are 113° C. or 121° C. Other temperatures and times can be used, depending on requirements.

In order to achieve the flame retardancy required for various applications, the content of the metal hydroxides is preferably about 10% by weight to 80% by weight. This proportion by weight is based on the total weight of the flame-retardant thermoplastic polyurethane comprising flame retardant, and also optionally catalyst, without further additives and/or auxiliaries. At higher fill levels, the mechanical properties of the corresponding polymer materials are unacceptably impaired. By way of example, there is an unacceptable reduction particularly in tensile strength and tensile strain at break, which are important for cable insulation. It is therefore advantageous to add other flame retardants, in particular those comprising phosphorus. If the polyurethane comprises at least one other flame retardant, the amount used of the metal hydroxide is preferably from 10% by weight to 65% by weight, more preferably from 20% by weight to 50% by weight, and more preferably from 25% by weight to 40% by weight. Again, this proportion by weight is based on the total weight of the flame-retardant thermoplastic polyurethane comprising flame retardant, and also optionally catalyst, additives, and/or auxiliaries.

Preferred metal hydroxides are aluminum hydroxide, aluminum oxide hydroxide, and also mixtures thereof. One preferred mixture is aluminum hydroxide and magnesium hydroxide. Particular preference is given to aluminum hydroxide. Aluminum hydroxide is very particularly preferred.

The specific surface area of the metal hydroxides is usually from 2 m$^2$/g to 150 m$^2$/g, but the surface area is preferably from 2 m$^2$/g to 9 m$^2$/g, more preferably from 3 m$^2$/g to 8 m$^2$/g, and particularly preferably from 3 m$^2$/g to 5 m$^2$/g.

The specific surface area is determined by the BET method in accordance with DIN ISO 9277:2003-05, using nitrogen.

Coating Materials:

In the invention, there is a coating at least to some extent surrounding the surface of the metal hydroxides, another expression used for this being "at least some extent of coating". The coating is equivalent to the frequently used expression "surface treatment". The coating adheres on the metal hydroxide either via interlock effects or via van der Waals forces, purely physically, or has chemical bonding to the metal hydroxide. This is achieved mainly via covalent interaction.

The surface treatment or surface modification which provides a coating around the enclosed part, in the present case the metal hydroxide, preferably aluminum hydroxide, aluminum oxide hydroxide, or a mixture of said hydroxides, particularly preferably aluminum hydroxide, is described in detail in the literature. "Particulate-Filled Polymer Composites" (2nd edition), edited by: Rothon, Roger N., 2003, Smithers Rapra Technology is a basic reference work which describes suitable materials, and also the coating technology. Chapter 4 is particularly relevant. Appropriate materials are available commercially, for example from Nabaltec, Schwandorf, or Martinswerke in Bergheim, both in Germany.

Preferred coating materials are saturated or unsaturated polymers using an acid function, preferably using at least one acrylic acid or one anhydride, preferably maleic anhydride, because these give particularly good attachment to the surface of the metal hydroxide. The polymer involves one polymer or a mixture of polymers, preference being given to one polymer. Preferred polymers are polymers of mono- and diolefins, mixtures thereof, copolymers of mono- and diolefins with one another or with other vinyl monomers, or polystyrene, or poly(p-methylstyrene), or poly(alpha-methylstyrene), or are copolymers of styrene or alpha-methylstyrene with dienes or with acrylic derivatives, or are graft copolymers of styrene or alpha-methylstyrene, or are halogen-containing polymers, polymers which derive from alpha- or beta-unsaturated acids and from derivatives of these, or are copolymers of these monomers with one another or with other unsaturated monomers.

Equally preferred coating materials are monomeric organic acids and their salts, preferably saturated fatty acids; unsaturated acids are less commonly used.

Preferred fatty acids comprise from 10 to 30 carbon atoms, preferably from 12 to 22 carbon atoms, in particular from 16 to 20 carbon atoms, and are aliphatic, and preferably have no double bonds. Stearic acid is very particularly preferred.

Preferred fatty acid derivatives are their salts, preferably of calcium, aluminum, magnesium or zinc. Particular preference is given to calcium, in particular in the form of calcium stearate.

Organosilane Compound

Other preferred substances which form a coating around the metal hydroxide, preferably aluminum hydroxide, aluminum oxide hydroxide, or a mixture of said hydroxides, more preferably aluminum hydroxide, are organosilane compounds having the following structure: $(R)_{4-n}$—Si—$X_n$, where n=1, 2, or 3.

X is a hydrolysable group which reacts with the surface of the metal hydroxide, also being termed a coupling group. It is preferable that the moiety R is a hydrocarbon moiety and that its selection is such that the organosilane compound has good miscibility with the TPU.

The moiety R has bonding to the silicon by way of a hydrolytically stable carbon-silicon bond, and can be reactive or inert. An example of a reactive moiety, which is preferably an unsaturated hydrocarbon moiety, is an allyl moiety. It is preferable that the moiety R is inert, and it is more preferably a saturated hydrocarbon moiety having from 2 to 30 carbon atoms, preferably having from 6 to 20 carbon atoms, and particularly preferably having from 8 to 18 carbon atoms, and it is more preferably a branched-chain or linear aliphatic hydrocarbon moiety.

It is more preferable that the organosilane compound comprises only one moiety R and has the general formula:

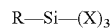

It is preferable that the coupling group X is a halogen, preferably chlorine, and that the coupling reagent is accordingly a tri-, di-, or monochlorosilane. It is equally preferable that the coupling group X is an alkoxy group, preferably a methoxy group or an ethoxy group.

It is very preferable that the moiety is the hexadecyl radical, preferably using the methoxy coupling group or ethoxy coupling group, the organosilane thus being the hexadecylsilane.

The amounts of the silanes applied to the metal hydroxide are from 0.1% by weight to 5% by weight, more preferably from 0.5% by weight to 1.5% by weight, and particularly preferably about 1% by weight, based on the total amount of the metal hydroxide.

The amounts of the carboxylic acids and carboxylic acid derivatives applied to the metal hydroxide are from 0.1% by weight to 5% by weight, more preferably from 1.5% by weight to 5% by weight, and particularly preferably from 3% by weight to 5% by weight, based on the total amount of the metal hydroxide.

It is preferable that the maximum dimension of more than 50%, more preferably more than 70%, more preferably more than 90%, of the metal hydroxides surrounded at least to some extent by a coating and preferably taking the form of powders is less than 10 μm, preferably less than 5 μm, particularly preferably less than 3 µm. At the same time, at least one maximum dimension of at least 50% of the particles, preferably at least 70%, more preferably at least 90%, is more than 0.1 µm, more preferably more than 0.5 µm, and particularly preferably more than 1 µm.

It is preferable that production of the thermoplastic polyurethanes of the invention uses previously coated metal hydroxides. This is the only way of avoiding undesired side reactions of the coating materials with the constituents of the thermoplastic polyurethane, and is a particularly effective way of providing the advantage of inhibiting oxidative degradation of the thermoplastic polyurethane. The coating of the metal hydroxide can also more preferably take place in the feed region of the extruder, before the polyurethane is added in a downstream portion of the extruder.

P-Acid Derivatives

In one preferred embodiment, the thermoplastic polyurethane comprises at least one other flame retardant which comprises phosphorus.

These materials are preferably derivatives of phosphoric acid, phosphonic acid, or phosphinic acid. It is preferable that said derivatives are salts with an organic or inorganic cation or are organic esters. Organic esters are derivatives of phosphorus-containing acids where at least one oxygen atom directly bonded to the phosphorus has been esterified with an organic moiety. In one preferred embodiment, the organic ester is an alkyl ester, and in another preferred embodiment it is an aryl ester. It is particularly preferable that all of the hydroxy groups of the corresponding phosphorus-containing acid have been esterified.

Preference is given to organic phosphate esters, in particular the triesters of phosphoric acid, e.g. trialkyl phosphates, and in particular triaryl phosphates, e.g. triphenyl phosphate.

Preferred flame retardants used in the invention for the TPU are phosphoric esters of the general formula (I)

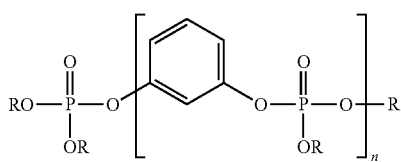

where R is unsubstituted or substituted alkyl, cycloalkyl, or phenyl groups, and n=from 1 to 15.

If R in the general formula (I) is an alkyl moiety, alkyl moieties that can in particular be used are those having from 1 to 8 carbon atoms. The cyclohexyl moiety may be mentioned as an example of the cycloalkyl groups. It is preferable to use phosphoric esters of the general formula (I) in which R=phenyl or alkyl-substituted phenyl. n in the general formula (I) is in particular 1 or is preferably in the range of about 3 to 6. Examples that may be mentioned for the preferred phosphoric esters of the general formula (I) are bis(diphenyl) 1,3-phenylenephosphate, bis(dixylenyl) 1,3-phenylenephosphate, and also the corresponding oligomeric products with an average degree of oligomerization of n=from 3 to 6.

A preferred resorcinol is resorcinol bis(diphenyl phosphate) (RDP), usually present in oligomers.

Other preferred phosphorus-containing flame retardants are bisphenol A bis(diphenyl phosphate) (BDP), usually present as oligomer, and diphenyl cresyl phosphate (DPC).

The organic phosphonates are salts with an organic or inorganic cation, or are the esters of phosphonic acid. Preferred esters of phosphonic acid are the diesters of alkyl- or phenylphosphonic acids. An example that may be mentioned of the phosphonic esters to be used as flame retardant in the invention is the phosphonates of the general formula (II)

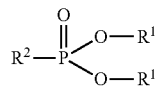

where $R^1$ is unsubstituted or substituted alkyl, cycloalkyl, or phenyl groups, where the two moieties $R^1$ can also have cyclic linkage to one another, and $R^2$ is an unsubstituted or substituted alkyl, cycloalkyl, or phenyl moiety.

Particularly suitable compounds here are cyclic phosphonates, e.g.

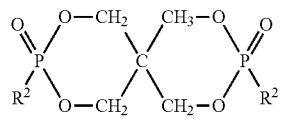

where $R^2$=$CH_3$ and $C_6H_5$, where these derive from pentaerythritol, or

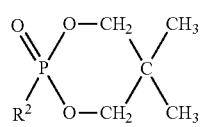

where $R^2$=$CH_3$ and $C_6H_5$, where these derive from neopentyl glycol, or

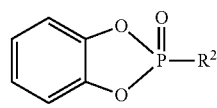

where $R^2$=$CH_3$ and $C_6H_5$, where these derive from pyrocatechol, or else

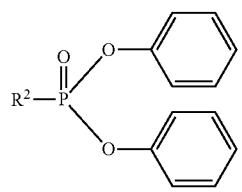

where $R^2$=an unsubstituted or substituted phenyl moiety.

Phosphinic esters have the general formula $R^1R^2(P=O)$ $OR^3$, where all three of the organic groups $R^1$, $R^2$, and $R^3$ can be identical or different. The moieties $R^1$, $R^2$, and $R^3$ are either aliphatic or aromatic and have from 1 to 20 carbon atoms, preferably from 1 to 10, more preferably from 1 to 3.

It is preferable that at least one of the moieties is aliphatic, and all of the moieties are preferably aliphatic, and it is very particularly preferable that $R^1$ and $R^2$ are ethyl moieties. It is more preferable that $R^3$, too, is an ethyl moiety or a methyl moiety. In one preferred embodiment, $R^1$, $R^2$, and $R^3$ are simultaneously an ethyl moiety or methyl moieties.

Preference is also given to phosphinates, i.e. the salts of phosphinic acid. The moieties $R^1$ and $R^2$ are either aliphatic or aromatic, and have from 1 to 20 carbon atoms, preferably from 1 to 10, more preferably from 1 to 3. It is preferable that at least one of the moieties is aliphatic, and all of the moieties are preferably aliphatic, and it is very particularly preferable that $R^1$ and $R^2$ are ethyl moieties. Preferred salts of the phosphinic acids are Al, Ca, and/or Zn salts. Aluminum diethylphosphinate is a preferred embodiment.

The phosphorus-containing flame retardants, and their salts, and/or their derivatives, are used in the form of individual substance or in a mixture. Another feature of a suitable flame-retardant system is that the content of phosphorus, based on the entire flame retardant, is greater than 5% by weight, more preferably greater than 7% by weight. At the same time, the content of phosphorus-containing flame retardants is less than 30% by weight, preferably less than 20% by weight, and particularly preferably less than 15% by weight.

The esters and/or salts of the phosphate-containing acid are preferably used alone or in a mixture with one another, together with a plurality of, or one, metal hydroxide(s) which is aluminum hydroxide, aluminum oxide hydroxide, or a mixture of said hydroxides, where one metal hydroxide is preferably aluminum hydroxide. Compounds used here comprise either a plurality of phosphoric esters, phosphonic esters, or phosphinic esters, or salts of these, or else respectively one or more phosphoric esters, phosphonic esters, or phosphinic esters, or salts of these, mixed with one another.

In a more preferred embodiment, phyllosilicate and/or hydrotalcite is/are also present in the flame-retardant thermoplastic polyurethane alongside these combinations described here of metal hydroxide with at least one ester and/or salt of a phosphate-containing acid.

One particularly preferred combination is resorcinol bis (diphenyl phosphate) (RDP), usually in its oligomeric form, with aluminum hydroxide and with a phyllosilicate and/or hydrotalcite. The combination of the various flame retardants optimizes mechanical properties and flame-retardancy properties for the respective requirement.

The invention uses the phosphoric esters, phosphonic esters, and/or phosphinic esters, and/or salts of these, in a mixture together with at least one metal hydroxide as flame retardants for the TPU, whereupon the ratio by weight of the total of the weight of the phosphate esters, phosphonate esters, and phosphinate esters used to metal hydroxide is preferably in the range from 1:5 to 1:2.

In one preferred embodiment, in which the flame-retardant thermoplastic polyurethane (TPU) comprises, at least, as further constituents, an at least partially coated metal hydroxide which is aluminum hydroxide, aluminum oxide hydroxide, or a mixture of said hydroxides, at least one phosphate-containing flame retardant, and at least one phyllosilicate and/or one hydrotalcite, the total of the percentages by weight (% by weight) of said constituents, the entirety of which is also termed flame retardant, in the polyurethane is from 10% by weight to 80% by weight, based on the polyurethane based on at least one diisocyanate and on at least one substance reactive toward isocyanate, and preferably on at least one chain extender, and also optionally on at least one catalyst, without addition of other auxiliaries or additives. Said total of said constituents is more preferably from 25% by weight to 70% by weight, more preferably from 40% by weight to 60% by weight, and particularly preferably from 45% by weight to 55% by weight.

All of the other weight data for the constituents are always likewise based on the polyurethane without further addition and/or auxiliaries.

If the material comprises the three flame retardants mentioned, it is more preferable that the amount comprised of the at least one phosphorus-containing flame retardant is from 3% by weight to 30% by weight, more preferably from 5% by weight to 20% by weight, and particularly preferably from 8% by weight to 15% by weight.

At the same time, the amount comprised of the at least one metal hydroxide is preferably from 10% by weight to 65% by weight, based on the polyurethane, preferably from 15% by weight to 50% by weight, and particularly preferably from 25% by weight to 40% by weight.

The amount comprised of the phyllosilicate and/or hydrotalcite is moreover from 0.5% by weight to 20% by weight, preferably from 3% by weight to 15% by weight, and particularly preferably from 3% by weight to 8% by weight.

It is more preferable that the parts-by-weight ratio of the at least one phosphorus-containing flame retardant to metal hydroxide to phyllosilicate and/or hydrotalcite is about 9 to 34 to 5.

In another preferred embodiment, the phosphorus-containing flame retardant is liquid at 21° C.

Phyllosilicates

Phyllosilicates are also termed lamellar silicates. Among the two-layer minerals are especially kaolinite and serpentine, and among the three-layer minerals are especially montmorillonite, and also the micas. The clay minerals are important phyllosilicates, and bentonites are preferably used.

In another preferred embodiment, intercalated phyllosilicates are used. Starting phyllosilicates for said intercalated phyllosilicates are preferably swellable smectites, such as montmorillonite, hectorite, saponite, beidellite, and bentonite.

It is more preferable that these are organically intercalated phyllosilicates which have a layer separation of about 1.5 nm to 4 nm. Said phyllosilicates have preferably been intercalated with quaternary ammonium compounds, with protonated amines, with organic phosphonium ions, and/or with aminocarboxylic acids.

Hydrotalcite

Hydrotalcite is used as an alternative to phyllosilicates and/or in a mixture therewith.

Hydrotalcite, too, has a layer structure. The term hydrotalcite also covers comblainite, desautelsite, pyroaurite, reevesite, sergeevite, stichtite, and takovite. One preferred hydrotalcite is based on aluminum and magnesium, and has been neutralized with hydroxide, nitrate, and/or carbonate ions in the intervening layers. One preferred hydrotalcite has the following molecular formula: $Mg_6Al_2[(OH)_{16}|CO_3]\cdot 4H_2O$.

Hydrotalcites are preferably organically intercalated materials, i.e. the anions located in the intervening layers, preferably hydroxide anions, are replaced at least to some extent by organic anions. Preference is given to fatty acids and/or hydrogenated fatty acids.

The organic intercalation improves processability. Dispersion of the phyllosilicates and/or of the hydrotalcite is more uniform on mixing with the thermoplastic polyurethanes.

Thermoplastic Polyurethanes (TPU)

Thermoplastic polyurethanes have been known for a long time. They are produced through reaction of the components (a) isocyanates and (b) compounds reactive toward isocyanates and having a number-average molar mass of from $0.5 \times 10^3$ g/mol to $0.1 \times 10^6$ g/mol, and, optionally, (c) chain extenders having a molar mass of from $0.05 \times 10^3$ g/mol to $0.499 \times 10^3$ g/mol, optionally in the presence of at least one (d) catalyst and/or (e) conventional auxiliaries and/or additives. Production processes can also be found in the following specifications: EP 0922552, DE 10103424, WO 2006/072461.

The components (a) isocyanate, (b) compounds reactive toward isocyanates, (c) chain extenders are also termed, individually or jointly, structural components.

The production process uses a belt system or a reactive extruder. As a function of the properties of each component, these are all mixed directly with one another, or individual components are premixed and/or prereacted, e.g. to give prepolymers, before they are involved in the polyaddition reaction. In another embodiment, a thermoplastic polyurethane is first formed from the structural components, optionally with catalyst, and auxiliaries can optionally then have been incorporated into said material. At least one flame retardant is then introduced into this material, and homogeneously dispersed. The homogeneous dispersion process preferably takes place in an extruder, with preference in a twin-screw extruder.

In order to adjust hardness of the TPU, the amounts used of structural components (b) and (c) can be varied within a relatively wide range of molar ratios, and hardness here rises with increasing content of chain extender (c).

In order to produce TPU such as those with Shore A hardness smaller than 95, preferably Shore A of from 95 to 75, particularly preferably about 85 A, the in essence difunctional polyhydroxy compounds (b) and chain extenders (c) can by way of example advantageously be used in molar ratios of from 1:1 to 1:5, preferably from 1:1.5 to 1:4.5, so that the hydroxy equivalent weight of the resultant mixtures of the structural components (b) and (c) is greater than 200, and in particular from 230 to 450, whereas in order to produce harder TPU, e.g. those with Shore A hardness greater than 98, preferably Shore D of from 55 to 75, the molar ratios of (b) to (c) are in the range from 1:5.5 to 1:15, preferably from 1:6 to 1:12, so that the resultant mixtures of (b) and (c) have a hydroxy equivalent weight of from 110 to 200, preferably from 120 to 180.

Preferred polyols are polyethers, and the ethers are more preferably polytetrahydrofuran (PTHF).

In order to produce the TPU of the invention, the structural components (a), (b), and (c) are reacted, preferably in the presence of catalysts (d) and optionally of auxiliaries and/or of additives (e), in amounts such that the equivalence ratio of NCO groups of the diisocyanates (a) to the entirety of the hydroxy groups of structural components (b) and (c) is from 0.9 to 1.1:1, preferably from 0.95 to 1.05:1, and in particular about 0.96 to 1.0:1.

In one embodiment, TPU and flame retardant are processed in a single operation. In another preferred embodiment, a reactive extruder, a belt system, or other suitable apparatuses are first used to produce a TPU, preferably in the form of granulated material, into which, in at least one further operation, or else in a plurality of operations, at least one further flame retardant, which is a metal hydroxide covered at least to some extent by a coating, is introduced, and the metal hydroxide is aluminum hydroxide, aluminum oxide hydroxide, or a mixture of said hydroxides, preferably aluminum hydroxide. The mixing of the thermoplastic polyurethane with the at least one metal hydroxide, and optionally also with at least one phosphorus-containing flame retardant, and optionally also with at least one phyllosilicate and/or hydrotalcite, takes place in mixing equipment which is preferably an internal mixer or an extruder, preferably a twin-screw extruder. In one preferred embodiment, at least one flame retardant introduced into the mixing equipment in the at least one further operation is liquid, i.e. liquid at a temperature of 21° C. In another preferred embodiment of the use of an extruder, the flame retardant introduced is liquid at a temperature which prevails behind the feed point in the direction of flow of the contents in the extruder.

It is preferable in the invention to produce TPU of which the number-average molar mass is at least $0.02 \times 10^6$ g/mol, preferably at least $0.06 \times 10^6$ g/mol, and in particular greater than $0.08 \times 10^6$ g/mol. The upper limit for the number-average molar mass of the TPU is very generally determined by processability, and also by the desired property profile. At the same time, the number-average molar mass of the TPU in the invention is not above about $0.2 \times 10^6$ g/mol, preferably $0.15 \times 10^6$ g/mol.

Preferred organic isocyanates (a) used are aliphatic, cycloaliphatic, araliphatic, and/or aromatic isocyanates, more preferably tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophoronediisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyl-diphenyl diisocyanate, 1,2-diphenylethane diisocyanate, and/or phenylene diisocyanate. It is particularly preferable to use 4,4'MDI.

Compounds (b) used that are reactive toward isocyanates are preferably polyesterols or polyetherols; the collective term "polyols" is also usually used for these. The number-average molar masses of said polyols are from $0.5 \times 10^3$ g/mol to $8 \times 10^3$ g/mol, preferably from $0.6 \times 10^3$ g/mol to $5 \times 10^3$ g/mol, in particular from $0.8 \times 10^3$ g/mol to $3 \times 10^3$ g/mol. The average functionality of the polyols is preferably from 1.8 to 2.3, preferably from 1.9 to 2.2, in particular 2. It is preferable that the polyols (b) have only primary hydroxy groups. It is more preferable that the polyols are polyetherols, very particularly preferably polytetrahydrofuran (PTHF).

Chain extenders (c) used can preferably be aliphatic, araliphatic, aromatic, and/or cycloaliphatic compounds with a molar mass of from 0.05 kg/mol to 0.499 kg/mol, preferably difunctional compounds, for example diamines and/or alkanediols having from 2 to 10 carbon atoms in the alkylene moiety, di-, tri-, tetra-, penta-, hexa-, hepta-, octa-, nona-, and/or decaalkylene glycols having from 3 to 8 carbon atoms, in particular ethylene 1,2-glycol, 1,3-propanediol, 1,4-butanediol, 1,6-hexanediol, and preferably corresponding oligo- and/or polypropylene glycols, and it is also possible here to use a mixture of the chain extenders. It is preferable that the compounds (c), also termed chain extenders, have only primary hydroxy groups, and very particular preference is given to 1,4-butanediol.

In one preferred embodiment, catalysts (d), which in particular accelerate the reaction between the NCO groups of the diisocyanates (a) and the hydroxy groups of the compound (b) reactive toward isocyanates and the chain extender (c), are tertiary amines, in particular triethylamine, dimethylcyclohexylamine, N-methylmorpholine, N,N'-dimethylpiperazine, 2-(dimethylamino-ethoxy)ethanol, diazabicyclo[2.2.2]octane, and in another preferred embodiment these are organometallic compounds, such as titanic esters, iron compounds, preferably iron(III) acetylacetonate, tin compounds, preferably tin diacetate, tin dioctoate, tin dilaurate, or the dialkyltin salts of aliphatic carboxylic acids, preferably dibutyltin diacetate, dibutyltin dilaurate, or bismuth salts in which bismuth preferably occurs in the oxidation states 2 or 3, in particular 3. Preference is given to salts of carboxylic acids. Carboxylic acids used are preferably carboxylic acids having from 6 to 14 carbon atoms, particularly preferably having from 8 to 12 carbon atoms. Examples of suitable bismuth salts are bismuth(III) neodecanoate, bismuth 2-ethylhexanoate, and bismuth octanoate.

Preferred amounts used of the catalysts (d) are from 0.0001 to 0.1 part by weight per 100 parts by weight of the compound (b) reactive toward isocyanates. It is preferable to use tin catalysts, in particular tin dioctoate.

It is also possible to add conventional auxiliaries (e), alongside catalysts (d), to the structural components (a) to (c). Examples of those that may be mentioned are surface-active substances, fillers, flame retardants, nucleating agents, oxidation stabilizers, lubricants and mold-release aids, dyes and pigments, and optionally other stabilizers, e.g. with respect to hydrolysis, light, heat, or discoloration, inorganic and/or organic fillers, reinforcing agents, and plasticizers. Suitable auxiliaries and additives can by way of example be found in Kunststoffhandbuch [Plastics Handbook], volume VII, edited by Vieweg and Höchtlen, Carl Hanser Verlag, Munich, 1966 (pp. 103-113).

One particularly preferred thermoplastic polyurethane is a material produced from diphenylmethane 2,2'-, 2,4'- and/or 4,4'-diisocyanate (MDI), preferably diphenylmethane 4,4"-diisocyanate, from the chain extender 1,4-butanediol, and polytetrahydrofuran (PTHF) with a number-average molar mass of about $1\times10^3$ g/mol. Said thermoplastic polyurethane is preferably produced with the polymerization catalyst tin dioctoate.

The present invention also provides the use of the flame-retardant thermoplastic polyurethanes (TPU) of the invention or of the flame-retardant preparation for producing coatings, damping elements, folding bellows, foils or fibers, moldings, floor coverings for buildings and transport, "non-woven" textiles, and preferably gaskets, rollers, shoe soles, hoses, cables, cable plugs, cable sheathing, cushioning, laminates, profiles, drive belts, saddles, foams, plug connectors, drag cables, solar modules, wiper blades, and cladding in automobiles. Preference is given to use for cable sheathing. The production process, preferably from granulated materials, uses injection molding, calendering, powder centering, or extrusion, and/or additional foaming of the TPU.

The invention also provides the use of mixtures comprising metal hydroxides surrounded at least to some extent by a coating, preferably aluminum oxide hydroxide, and/or aluminum hydroxide, particularly preferably aluminum hydroxide, as flame retardant in polyurethane, preferably in thermoplastic polyurethane.

Other embodiments of the present invention can be found in the claims and in the examples. The abovementioned features of the subject matter/process/uses of the invention, and the features thereof explained hereinafter, can of course be used not only in the respective stated combination but also in other combinations, without exceeding the scope of the invention.

By way of example, therefore, the combination of a preferred feature with a particularly preferred feature, or of a feature not further characterized with a particularly preferred feature, etc., is implicitly comprised even if said combination is not expressly mentioned.

The examples below serve to illustrate the invention, but are not in any way to be considered restrictive in respect of the concepts underlying the invention.

EXAMPLES

The improved aging resistance of the compositions of the invention with coated metal hydroxide particles will now be demonstrated by using examples.

Example 1 (Starting Materials)

Elastollan 1185A10: TPU of Shore hardness 85 A from BASF Polyurethanes GmbH, Elastogranstrasse 60, 49448 Lemforde, based on polytetrahydrofuran (PTHF) 1000, 1,4-butanediol, and MDI.

Martinal OL 104 LEO: aluminum hydroxide without coating, Martinswerk GmbH, Kölner Strasse 110, 50127 Bergheim, $Al(OH)_3$ content [%]≈99.4, particle size (laser scattering, Cilas) [μm] D50: from 1.7 to 2.1; specific surface area (BET) [$m^2$/g]: from 3 to 5.

Apyral 40 CD: aluminum hydroxide without coating, Nabaltec AG, Alustrasse 50-52 D-92421 Schwandorf, $Al(OH)_3$ content [%]≈99.5, particle size (laser scattering) [μm] D50: 1.3, specific surface area (BET) [$m^2$/g]: 3.5.

Apyral 40 HSI: aluminum hydroxide with a hydrophobic surface coating based on about 1% of hexadecylsilane, Nabaltec AG, Alustrasse 50-52, D-92421 Schwandorf, $Al(OH)_3$ content [%]≈99.5, particle size (laser scattering) [μm] D50: 1.4, specific surface area (BET) [$m^2$/g]: 3.5.

Magnifin H5 MV: magnesium hydroxide with a hydrophobic surface coating, Martinswerk GmbH, Kölner Strasse 110, 50127 Bergheim, $Mg(OH)_2$ content [%]>99.8, particle size (laser scattering) [μm] D50: from 1.6 to 2; specific surface area (BET) [$m^2$/g]: from 2 to 5.

Nanofil 15: organically modified nanodispersible phyllosilicate based on natural bentonites, Rockwood Clay Additives GmbH, Stadtwaldstraβe 44, D-85368 Moosburg, powder, D50 average grain size=40 μm, i.e. the size of at least 50% of the particles is less than 40 μm.

Fyrolflex RDP: resorcinol bis(diphenyl phosphate), CAS #: 125997-21-9, Supresta Netherlands B.V., Office Park De Hoef, Hoefseweg 1, 3821 AE Amersfoort, The Netherlands.

Example 2 (Aging Resistance)

In order to evaluate oxidative aging resistance, a test specimen is aged at 113° C. for 7 days, and at 121° C. for 7 days, in a convection oven, and mechanical parameters are then determined. Tables 2 and 3 below collate the results.

Example 3 (Compositions)

The tables below list compositions in which the parts by weight (PW) of the individual starting materials have been stated. In each case, the mixtures were produced in a ZE 40 A twin-screw extruder from Berstorff with screw length of 35 D, divided into 10 barrel sections, and then extruded using an Arenz single-screw extruder with a three-zone screw with mixing section (screw ratio 1:3) to give foils of thickness 1.6 mm.

TABLE 1

| | | Experiment number | | | | |
|---|---|---|---|---|---|---|
| | Parts by weight [PW] | 1 Comparative example | 2 Comparative example | 3 Mixture of the invention | 4 Comparative example | 5 Comparative example |
| Elastollan 1185A10 | [PW] | 51 | 51 | 51 | 51 | 51 |
| Fyrolflex RDP | [PW] | 10 | 10 | 10 | 10 | 10 |
| Nanofil 15 | [PW] | 5 | 5 | 5 | 5 | 5 |
| Martinal OL 104 LEO | [PW] | 34 | | | | 17 |
| Apyral 40 CD | [PW] | | 34 | | | |
| Apyral 40 HS1 | [PW] | | | 34 | | |
| Magnifin H5MV | [PW] | | | | 34 | 17 |

TABLE 2

| | | | Experiment numbers: | | | | |
|---|---|---|---|---|---|---|---|
| Properties | Standard | Unit | 1 | 2 | 3 | 4 | 5 |
| Tensile strength | DIN 53504 | [MPa] | 26 | 22 | 26 | 29 | 29 |
| Tensile strain at break | | [%] | 660 | 650 | 610 | 570 | 570 |
| after aging for 7 d/113° C. | | | | | | | |
| Tensile strength | DIN 53504 | [MPa] | 16 | 15 | 21 | 25 | 22 |
| Change in tensile strength | | [%] | −38 | −32 | −19 | −14 | −24 |
| Tensile strain at break | DIN 53504 | [%] | 650 | 700 | 730 | 690 | 690 |
| Change in tensile strain at break | | [%] | +14 | +8 | +20 | +21 | +21 |

TABLE 3

| Properties | | | 1 | 2 | 3 | 4 | 5 |
|---|---|---|---|---|---|---|---|
| Tensile strength | DIN 53504 | [MPa] | 24 | 22 | 29 | 29 | 29 |
| Tensile strain at break | | [%] | 660 | 640 | 610 | 570 | 570 |
| after aging for 7 d/121° C. | | | | | | | |
| Tensile strength | DIN 53504 | [MPa] | 10 | 9 | 17 | 21 | 19 |
| Change in tensile strength | | [%] | −58 | −59 | −41 | −28 | −34 |
| Tensile strain at break | DIN 53504 | [%] | 430 | 450 | 610 | 660 | 650 |

TABLE 3-continued

| Properties | | 1 | 2 | 3 | 4 | 5 |
|---|---|---|---|---|---|---|
| Change in tensile strain at break | [%] | −35 | −30 | 0 | 16 | 14 |

Mixtures 1 and 2 are comparative examples in which uncoated metal hydroxides were used.

Mixtures 3-5 demonstrate that the use of coated metal hydroxides significantly reduces strength loss due to heat treatment, i.e. significantly improves oxidative aging resistance. The effect is also apparent when the mixture also comprises phosphoric ester and phyllosilicate in addition to the coated metal hydroxide.

Example 4 (Flame Retardancy)

In order to evaluate flame retardancy, a test specimen of thickness 5 mm is tested horizontally with radiation of intensity 35 kW/m$^2$ in a cone calorimeter in accordance with ISO 5660 part 1 and part 2 (2002-12).

The test specimens for the cone measurements with dimensions 200×150×5 mm were injection molded in an Arburg 520S with screw diameter 30 mm (zone 1-zone 3: 180° C., zone 4-zone 6: 185° C.). The sheets were then sawn to the size needed for the cone measurement.

TABLE 4

| | | | Experiment numbers: | |
|---|---|---|---|---|
| Properties | Specification | Unit | 3 | 4 |
| Time to ignition | ISO 5660 part 1 | [s] | 72 | 80 |
| THR, total heat release | | [MJ/m$^2$] | 116 | 130 |
| PHRR, peak of heat release rate | | [kW/m$^2$] | 215 | 291 |
| PHRR/tig | | [kW/m$^2$s] | 2.99 | 3.64 |

Table 4 gives the results of cone calorimeter measurement on experiment 3 of the invention in comparison with experiment 4, in which magnesium hydroxide was used as flame retardant. According to Petrella (Petrella R. V., The assessment of full scale fire hazards from cone calorimeter data, Journal of Fire Science, 12 (1994), p. 14), the quotient calculated from peak of heat release rate and time to ignition is a measure of the contribution that the material concerned makes to a rapidly growing fire. The total heat release is moreover a measure of the contribution that the material concerned makes to a fire of long duration.

The results of the cone calorimeter measurements of experiment numbers 3 and 4 were depicted graphically in a Petrella plot, shown in FIG. 1. The tendency of the material to contribute to a rapidly growing fire increases in the direction of the x-axis. The quotient PHRR/tig has been plotted with the unit [kW/m$^2$ s]. The tendency of the material to contribute to a fire of long duration (THR) has been plotted on the y-axis with the unit [MJ/m$^2$]. Materials with better flame retardancy values here exhibit minimum x and y values. The results are collated both in table 4 and the Petrella plot of FIG. 1.

The invention claimed is:

1. A flame-retardant thermoplastic polyurethane composition, comprising, in reacted form:
   a diisocyanate;
   a substance reactive toward isocyanate;
   optionally, a chain extender;
   optionally, a catalyst;
   a flame retardant; and
   optionally, an additive and/or auxiliary,
   wherein the flame retardant comprises a metal hydroxide at least partially surrounded by a coating, and the metal hydroxide is aluminum hydroxide,
   wherein the coating comprises an organosilane compound having the following structure:

$(R)_{4-n}$—Si—$X_n$, where $n=3$, wherein X is a hydrolysable group which reacts with the surface of the metal hydroxide and R is a saturated hydrocarbon moiety having from 8 to 18 carbon atoms,
   wherein the coating is present in an amount of from 0.5% by weight to 1.5% by weight based on total amount of the metal hydroxide,
   wherein the metal hydroxide is present in an amount of from 10% to 65% by weight, based on the polyurethane,
   and wherein a shore A hardness of the thermoplastic polyurethane is lower than 95 A.

2. The polyurethane composition of claim 1, further comprising:
   a phosphorus-comprising flame retardant which is a derivative of phosphoric acid, phosphonic acid, phosphinic acid, or any mixture thereof.

3. The polyurethane composition of claim 2, wherein the phosphorus-comprising flame retardant is liquid at 21° C.

4. The polyurethane composition of claim 2, further comprising:
   hydrotalcite, phyllosilicate, or a mixture thereof.

5. The polyurethane composition of claim 4, wherein the phyllosilicate is an organically intercalated phyllosilicate or an organically intercalated hydrotalcite.

6. The polyurethane composition of claim 4, wherein the sum of the percentages by weight of all of the flame retardants and of the phyllosilicate and/or of the hydrotalcite in the polyurethane is from 10% by weight to 80% by weight, based on the total weight of the diisocyanate, the substance reactive toward isocyanate, the chain extender, and the catalyst.

7. The polyurethane composition of claim 6, wherein the ratio of the weight of phosphorus-comprising flame retardant to metal hydroxide to phyllosilicate and/or hydrotalcite is 9 to 34 to 5.

8. The polyurethane composition of claim 1, wherein the specific surface area of the metal hydroxide is from 2 $m^2$/g to 9 $m^2$/g.

9. The polyurethane composition of claim 1, wherein the maximum dimension of more than 50% of the metal hydroxides partially surrounded by a coating is less than 10 μm.

10. The polyurethane composition of claim 1, wherein the coating comprises hexadecylsilane.

11. The polyurethane composition of claim 1, wherein the number-average molar mass of the substance reactive toward isocyanate is from 500 g/mol to $6 \times 10^3$ g/mol.

12. The polyurethane composition of claim 11, wherein the substance reactive toward isocyanate is a polyether polyol.

13. A cable sheathing, comprising the polyurethane composition of claim 1.

14. A process for producing a thermoplastic polyurethane composition according to claim 1, the processing comprising:
   (I) reacting a mixture comprising a diisocyanate, a substance reactive toward isocyanate, optionally a chain extender, optionally a catalyst, and optionally an additive and/or auxiliary, to obtain a thermoplastic polyurethane; and, then
   (II) adding, to the thermoplastic polyurethane, a flame retardant, which is a metal hydroxide comprising, at least to some extent, a coating which comprises an organosilane compound having the following structure:

$(R)_{4-n}$—Si—$X_n$, where $n=3$, wherein X is a hydrolysable group which reacts with the surface of the metal hydroxide and R is a saturated hydrocarbon moiety having from 8 to 18 carbon atoms,
   wherein the metal hydroxide is aluminum hydroxide.

15. The process of claim 14, wherein a second flame retardant, which is liquid at 21° C. and comprises phosphorus, is added to the thermoplastic polyurethane in (II).

* * * * *